United States Patent
Lee et al.

(10) Patent No.: US 8,981,007 B2
(45) Date of Patent: Mar. 17, 2015

(54) NON-CROSSLINKED POLYETHYLENE COMPOSITION FOR POWER CABLE

(71) Applicants: SK Innovation Co., Ltd., Seoul (KR); SK Global Chemical Co., Ltd., Seoul (KR)

(72) Inventors: Jae Soon Lee, Daejeon (KR); Kyu Cheol Cho, Seoul (KR); Kwang Hoi Ku, Daejeon (KR)

(73) Assignees: SK Innovation Co., Ltd. (KR); SK Global Chemical Co., Ltd. (KR)

( * ) Notice: Subject to any disclaimer, the term of this patent is extended or adjusted under 35 U.S.C. 154(b) by 0 days.

(21) Appl. No.: 13/849,587

(22) Filed: Mar. 25, 2013

(65) Prior Publication Data

US 2013/0253128 A1    Sep. 26, 2013

(30) Foreign Application Priority Data

Mar. 26, 2012  (KR) .................. 10-2012-0030344

(51) Int. Cl.
  C08L 23/00    (2006.01)
  C08L 23/04    (2006.01)
  C08L 23/08    (2006.01)
  H01B 3/30     (2006.01)
  H01B 3/44     (2006.01)

(52) U.S. Cl.
  CPC ............. *H01B 3/307* (2013.01); *C08L 23/0815* (2013.01); *H01B 3/441* (2013.01)
  USPC ............... 525/240; 174/110 SR; 174/110 PM

(58) Field of Classification Search
  CPC .. C08L 23/0815; C08L 23/0807; C08L 23/08
  USPC ........................................... 525/240
  IPC .................. C08L 23/02, 23/08, 23/18
  See application file for complete search history.

(56) References Cited

U.S. PATENT DOCUMENTS

| 4,426,497 | A  |   | 1/1984  | Kent |
| 5,663,236 | A  | * | 9/1997  | Takahashi et al. ............ 525/240 |
| 6,284,178 | B1 |   | 9/2001  | Russell et al. |
| 6,329,465 | B1 | * | 12/2001 | Takahashi et al. ............ 525/191 |
| 2012/0012363 | A1 | * | 1/2012 | Cho et al. ................ 174/120 SC |

FOREIGN PATENT DOCUMENTS

| JP | 11176250     | 7/1999  |
| KR | 1020050017920 | 2/2005  |
| KR | 100632602    | 9/2006  |
| KR | 20100106871  | 10/2010 |

OTHER PUBLICATIONS

Doak, K.W.; James, D.E. "Ethylene Polymers", Concise Encyclopedia of Polymer Science and Engineering, Kroschwitz, J. I., Ed., 1990, p. 349-354.*
Cho et al., KR 10-2010-0106871 A (Oct. 4, 2010); KIPO machine translation.*

* cited by examiner

*Primary Examiner* — Rip A Lee
(74) *Attorney, Agent, or Firm* — Cantor Colburn LLP

(57) ABSTRACT

Provided is a non-crosslinked polyethylene composition for a power cable in which crosslinked polyethylene widely used in the world as an existing insulator for a power cable is replaced with a non-crosslinked polyethylene resin, and more particularly, a non-crosslinked polyethylene composition for a power cable having excellent processability, AC dielectric breakdown strength, space charge distribution, and water tree resistance.

4 Claims, No Drawings

US 8,981,007 B2

NON-CROSSLINKED POLYETHYLENE COMPOSITION FOR POWER CABLE

TECHNICAL FIELD

The present invention relates to a non-crosslinked polyethylene composition for a power cable in which crosslinked polyethylene widely used in the world as an existing insulator for a power cable is replaced with a non-crosslinked polyethylene resin, and more particularly, to a non-crosslinked polyethylene composition for a power cable having excellent processability, AC dielectric breakdown strength, space charge distribution, and water tree resistance.

BACKGROUND ART

Until the 1950s, a non-crosslinked polyethylene resin was mainly used as an insulating material of a power cable, but the non-crosslinked polyethylene resin had limitations in long-term heat resistance and durability. Since a crosslinking technology for improving long-term heat resistance and durability of polyethylene was developed by Union Carbide (USA) in the 1950s, currently, crosslinked polyethylene has been mainly used in the power cable.

As a method of crosslinking polyethylene, there are a method of crosslinking polyethylene by a chemical reaction using organic peroxide or silane (U.S. Pat. No. 6,284,178, Sep. 4, 2011), a method of crosslinking polyethylene using an electron beam (U.S. Pat. No. 4,426,497, Jan. 17, 1984), and the like. Recently, the method of crosslinking polyethylene using the organic peroxide has been widely used in a cable industry.

Since the crosslinked polyethylene resin is a thermoset resin, the polyethylene resin has excellent heat resistance, chemical resistance, and electrical properties.

However, since the crosslinked polyethylene resin is the thermoset resin and the thermoset resin is not recyclable, it is difficult to dispose of the waste polyethylene resin, thereby causing environmental pollution. Therefore, there is a demand for an eco-friendly non-crosslinked type thermoplastic polyethylene resin, but heat resistant of the non-crosslinked type thermoplastic polyethylene resin was significantly insufficient as compared with the crosslinked polyethylene resin, such that there was a limitation in using the non-crosslinked polyethylene as the insulator of the power cable.

Nevertheless, in some countries such as France, and the like in Europe, the thermoplastic polyethylene resin is used as the insulator of the power cable in order to protect the environment and avoid the above-mentioned disadvantages of the crosslinked polyethylene resin.

In a process of producing power cables with the polyethylene crosslinked by the organic peroxide, a crosslinking process is essential. At the time of the crosslinking, high-pressure and high-temperature conditions are required, and productivity thereof is significantly low, such that a difference in a crosslinking degree may be generated even with a slight change in the process condition, thereby deteriorating uniformity of the product.

In addition, during the crosslinking process, the organic peroxide is decomposed by heat to form radicals, thereby completing the crosslinking reaction. At this time, cumyl alcohol, methane, and the like, are generated as by-products of the crosslinking reaction to form bubbles in the insulator. In order to remove this bubble, high pressure of 5 atm or more should be applied. Bubbles that are not removed may cause breakage of the insulator of the power cable.

Against this backdrop, research into a non-crosslinked polyethylene resin as the insulating material of the power cable was disclosed in Korean Patent Laid-Open Publication No. 10-2010-0106871 (Dec. 4, 2010). However, at the time of actually processing the non-crosslinked polyethylene resin, processability is poor due to low shear thinning of the resin, such that a processability defect may be generated.

In addition, AC dielectric breakdown strength, space charge distribution, and water tree resistance are poor, such that performance as the insulator may be deteriorated.

RELATED ART DOCUMENT

Patent Document

U.S. Pat. No. 6,284,178 (Sep. 4, 2011)
U.S. Pat. No. 4,426,497 (Jan. 17, 1984)
Korean Patent Laid-Open Publication No. 10-2010-0106871 (Oct. 4, 2010)

Technical Problem

An object of the present invention is to provide a composition using a non-crosslinked polyethylene resin capable of being recycled and eco-friendly and significantly decreasing a process cost. Therefore, an object of the present invention is to provide a composition using polyethylene including α-olefin having at least four carbon atoms as a comonomer so as to improve long-term heat resistance and durability as compared with the existing polyethylene resin.

In addition, another object of the present invention is to provide a composition further including a low-density polyethylene resin having specific properties in order to further improve processability.

Further, another object of the present invention is to provide a composition further including a polyethylene resin including a polar group in a chain in order to improve space charge distribution.

Furthermore, another object of the present invention is to provide a composition capable of being used in a semi-conducting layer and a sheath layer as well as an insulating layer.

Technical Solution

In one general aspect, there is provided a composition used at the time of manufacturing a power cable, more particularly, a non-crosslinked polyethylene composition for a power cable including: a binder including a linear polyethylene resin including α-olefin having at least four carbon atoms as a comonomer and having a melt index of 0.5 to 2.2 g/10 min (at 190° C. under a load of 2.16 kg), a molecular weight distribution of 2 to 5, and a density of 0.920 to 0.945 g/cm$^3$; and additives.

In another general aspect, there is provided a non-crosslinked polyethylene composition for a power cable including: a binder including 70 to 95 weight % of a linear polyethylene resin including α-olefin having at least four carbon atoms as a comonomer and having a melt index of 0.5 to 2.2 g/10 min (at 190° C. under a load of 2.16 kg), a molecular weight distribution of 2 to 5, and a density of 0.920 to 0.945 g/cm$^3$ and 5 to 35 weight % of a low-density polyethylene resin having a melt index of 0.3 to 12 g/10 min (at 190° C. under a load of 2.16 kg) and a molecular weight distribution of 2 to 5; and additives.

In another general aspect, there is provided a non-crosslinked polyethylene composition for a power cable further including 1 to 20 parts by weight of polyethylene including 0.1 to 2 weight % of polar group in a chain and having a density of 0.920 to 0.960 g/cm³ based on the 100 parts by weight of the binder.

In another general aspect, there is provided a power cable or a multi-layer power cable in which the non-crosslinked polyethylene composition is used.

Advantageous Effects

According to the present invention, there is provided a non-crosslinked polyethylene composition capable of being reused and eco-friendly since it is not crosslinked and having excellent processability, space charge distribution, and water tree resistance as compared with the existing non-crosslinked polyethylene resin.

MODE FOR INVENTION

Hereinafter, the present invention will be described in more detail.

In a first aspect, the present invention relates to a non-crosslinked polyethylene composition for a power cable including 0.1 to 20 parts by weight of additives based on 100 parts by weight of a binder including a linear polyethylene resin including α-olefin having at least four carbon atoms as a comonomer and having a melt index of 0.5 to 2.2 g/10 min (at 190° C. under a load of 2.16 kg), a molecular weight distribution of 2 to 5, and a density of 0.920 to 0.945 g/cm³.

In a second aspect, the present invention relates to a non-crosslinked polyethylene composition for a power cable including 0.1 to 20 parts by weight of additives based on 100 parts by weight of a binder including 70 to 95 weight % of a linear polyethylene resin including α-olefin having at least four carbon atoms as a comonomer and having a melt index of 0.5 to 2.2 g/10 min (at 190° C. under a load of 2.16 kg), a molecular weight distribution of 2 to 5, and a density of 0.920 to 0.945 g/cm³ and 5 to 30 weight % of a low-density polyethylene resin having a melt index of 0.3 to 12 g/10 min (at 190° C. under a load of 2.16 kg) and a molecular weight distribution of 2 to 6.

In a third aspect, the present invention relates to a non-crosslinked polyethylene composition for a power cable including 1 to 20 parts by weight of polyethylene including 0.1 to 2 weight % of polar group in a chain and having a density of 0.920 to 0.960 g/cm³ and 0.1 to 20 parts by weight of additives based on 100 parts by weight of a binder including a linear polyethylene resin including α-olefin having at least four carbon atoms as a comonomer and having a melt index of 0.5 to 2.2 g/10 min (at 190° C. under a load of 2.16 kg), a molecular weight distribution of 2 to 5, and a density of 0.920 to 0.945 g/cm³.

In a fourth aspect, the present invention relates to a non-crosslinked polyethylene composition for a power cable including 1 to 20 parts by weight of polyethylene including 0.1 to 2 weight % of polar group in a chain and having a density of 0.920 to 0.960 g/cm³ and 0.1 to 20 parts by weight of additives based on 100 parts by weight of a binder including 70 to 95 weight % of a linear polyethylene resin including α-olefin having at least four carbon atoms as a comonomer and having a melt index of 0.5 to 2.2 g/10 min (at 190° C. under a load of 2.16 kg), a molecular weight distribution of 2 to 5, and a density of 0.920 to 0.945 g/cm³ and 5 to 35 weight % of a low-density polyethylene resin having a melt index of 0.3 to 12 g/10 min (at 190° C. under a load of 2.16 kg) and a molecular weight distribution of 2 to 5.

In addition, the present invention includes a power cable in which any one of the compositions as described above is used in an insulating layer, a semi-conducting layer, or a sheath layer.

Hereinafter, the present invention will be described in more detail.

In the present invention, in order to significantly increasing long-term heat resistance and durability without crosslinking polyethylene, α-olefin comonomer is used to induce formation of tie-molecules. In addition, additives for improving the heat resistance are appropriately added. Here, the additives include an oxidation stabilizer for securing long-term stability against oxidation, a UV stabilizer for preventing decomposition and oxidation by UV included in sunlight, a processing aid for improving processability, and the like.

The polyethylene resin essentially used in the present invention contains α-olefin having at least four carbon atoms as the comonomer. The α-olefin having at least four carbon atoms is selected from butene, pentene, methylpentene, hexene, octene, and decene.

Further, the polyethylene resin has a melt index (hereinafter, MI) of 0.5 to 2.2 g/10 min (at 190° C. under a load of 2.16 kg). In the case in which the MI is less than 0.5 g/10 min, productivity in a cable manufacturing process is decreased, thereby decreasing economic efficiency, and in the case in which the MI is more than 2.2 g/10 min, basic properties may be deteriorated at the time of applying the polyethylene resin to the power cable. In addition, the polyethylene resin has a molecular weight distribution of 2 to 5. In the case in which the molecular weight distribution is less than 2, a melt fracture may be generated on a surface at the time of processing a power cable, and in the case in which the molecular weight distribution is more than 5, polymerization of polyethylene may be difficult. More preferably, when the molecular weight distribution is in a range of 2.5 to 3.5, resin synthesis process may be easily performed, and processability of the resin into a power cable may be more excellent.

In addition, the polyethylene resin may have a density of 0.920 to 0.945 g/cm³. When the density is less than 0.920 g/cm³, the polyethylene resin is excessively soft, such that it may be difficult to impart hardness, and when the density is more than 0.945 g/cm³, the polyethylene resin is excessively stiff, such that it may be difficult to use the polyethylene resin.

During a polymerization process of the polyethylene resin, α-olefin induces formation of tie-molecules forming bonds with the carbon main chain and strongly linking crystalline portions and amorphous portions of the resin, thereby improving long-term heat resistance and electrical properties.

According to the present invention, the polyethylene resin may be used alone, but in order to improve processability and AC dielectric breakdown performance, the polyethylene resin may be used in combination with a low-density polyethylene resin having an MI of 0.3 to 12 g/10 min (at 190° C. under a load of 2.16 kg) and a molecular weight distribution of 2 to 6. In this case, when the content of the low-density polyethylene resin is 5 to 30 weight % based on 100 parts by weight of the total binder, more excellent processability and dielectric breakdown performance may be obtained. In the case in which the content of the low-density polyethylene resin is more than 30 weight %, the mechanical properties may be deteriorated, and in the case in which the low-density polyethylene resin is less than 5 weight %, an effect of improving processability and dielectric breakdown performance may be insignificant. The term "low-density polyethylene" means polyethylene having a density of 0.925 or less and generally referred to as a "LDPE" in the art.

In the present invention, the low-density polyethylene resin has a melt index of 0.3 to 12 g/10 min (at 190° C. under a load of 2.16 kg). When the MI is less than 0.3 g/10 min, it may be difficult to process the resin in the existing processing device, and productivity may be deteriorated. When the MI is more than 12 g/10 min, the effect of improving the processability and dielectric breakdown performance may be insignificant.

Further, the low-density polyethylene resin has a molecular weight distribution of 2 to 6. In the case in which the molecular weight distribution is less than 2, the processability may be deteriorated, and in the case in which the molecular weight distribution is more than 6, an effect of improving the long-term heat resistance may be insignificant. More preferably, when the molecular weight distribution is in a range of 2.5 to 4.5, the long-term heat resistance may be more excellent.

In the present invention, the polyethylene resin and the low-density polyethylene resin may have either unimodal or bimodal distribution of molecular weight and density.

The composition according to the present invention includes at least one additive selected from the oxidation stabilizer, the UV stabilizer, and the processing aid, and the content of the additives is specifically 0.1 to 20 parts by weight, more preferably 0.1 to 8 parts by weight. The content of the additives may be preferably 0.1 to 8 parts by weight based on 100 parts by weight of the entire resin. In the case in which the content is less than 0.1 parts by weight, degradation of a polymer may be accelerated when the polymer is used for 20,000 hours or more, and in the case in which the content is more than 20 parts by weight, the mechanical property of the polyethylene resin may be deteriorated.

The oxidation stabilizer and the UV stabilizer are used to improve long-term creep property during transport, storage and used of the power cable. More specifically, for example, the oxidation stabilizer and the UV stabilizer may be selected from a group consisting of hindered phenols, phosphates, benzophenones, hindered amine light stabilizers (HALS), and thioesters.

In addition, the processing aid is used to improve the heat resistance and decrease a process load. More specifically, for example, the processing aid may be selected from a group consisting of fluoro-elastomer and fluoro-olefin copolymer compounds.

In the composition according to the present invention, the polyethylene having a density of 0.920 to 0.960 g/cm$^3$ and including 0.1 to 2 parts by weight of a polar group in a chain may be used in order to improve the space charge distribution and water tree resistance, wherein the polar group indicates a compound including a carbonyl group. Particularly, the content of the polyethylene as described above may be in a range of 0.1 to 2 weight %. In the case in which the content is less than 0.1 weight %, it is impossible to improve the space charge distribution and water tree resistance, and in the case in which the content is more than 2 weight %, the polar group may be excessively introduced, thereby deteriorating properties of the insulating layer. In the case in which the density is less than 0.920 g/cm$^3$, it is difficult to impart hardness, and in the case in which the density is more than 0.960 g/cm$^3$, the polyethylene is excessively stiff, such that the polyethylene may have an influence on the main resin.

The power cable manufactured using the non-crosslinked polyethylene composition for a power cable according to the present invention is included in the scope of the present invention and may be applied to an insulating layer, a semi-conducting layer, or a sheath layer.

Hereinafter, Examples will be provided in order to describe the present invention in more detail. However, the present invention is not limited to the following Examples.

Processability, a mechanical property and heat resistance test, water tree resistance, an AC dielectric breakdown strength test, and space charge distribution of a compositions of the present invention were measured.

All of the polyethylenes used in the Examples and Comparative Examples were non-crosslinked polyethylene.

1) Evaluation of Processability

The processability is a property related to productivity of an insulating layer, and in the case in which the processability is decreased, a surface is not smooth but rough even at the same processing speed.

<Evaluation Method>

A device used in the evaluation was a single screw extruder (screw diameter=30 mm, L/D=25). In the case in which an insulating layer was coated by extruding the composition at 100 rpm using this device, roughness of a surface of the insulating layer were evaluated. At this time, a temperature was 210° C.

⊚: The number of generated melt fractures per 20 cm was less than 3.

◯: The number of generated melt fractures per 20 cm was less than 10.

Δ: The number of generated melt fractures per 20 cm was less than 30.

X: The number of generated melt fractures per 20 cm was 30 or more.

The "melt fracture" is a term indicating "a processing defect" generally understood in the art, and one bend is regarded as one melt fracture.

2) Mechanical Property and Heat Resistance Test

<Evaluation Method>

A heat resistance test of an insulating material of a power cable was performed according to KEPCO Standard ES-6145-0006. As specified in 4.3.5 of the standard, a room temperature test was performed according to KSC 3004, 19 and a heating test was performed according to KSC 3004, 20 (heating). In this case, after a test sample was placed in a convection oven of 120° C. for 120 hours and then kept at room temperature (24° C.) for 4 hours, tensile strength (fracture) and elongation were measured within 10 hours according to ASTM D638.

3) Evaluation of Water Tree Resistance

Water tree is a typical degradation phenomenon generated when an electric field and moisture are simultaneously present in an insulator for a power cable and essentially examined at the time of testing long-term performance of the insulator for the cable. Water tree degradation phenomenon itself is a phenomenon that is relatively slowly generated over a long term differently from an electric tree, and generation of the water tree itself does not directly mean insulation breakdown or replacement of the cable. However, the water tree results in a dielectric loss in the insulator by applied AC voltage, a decrease in a dielectric breakdown electric field, and the like, thereby deteriorating the entire dielectric strength. A detailed view with respect to the water tree was shown in Figure 1.

<Evaluation Method>

Measurement was performed using a frequency accelerated degradation test. In more detail, a voltage of 7.5 kVrms with a frequency of 1 kHz was applied to each of the samples having a thickness of 700 μm for 110 hours.

Artificial surface scratches were uniformly formed on the prepared circular sample having a diameter 36 mm using a 220 grit sand paper in one direction. Impurities were removed from the scratched surface using alcohol, and an electrode was formed on the other surface by thinly applying silver paste (Dotite D-500). The sample prepared as described above was assembled in a water tree accelerated degradation cell, and degradation was accelerated to generate an artificial water tree in the sample. In order to completely infiltrate an aqueous solution into gaps of fine scratches on the scratched surface, the sample was treated in a weak vacuum of 10 to 20 Torr to thereby be degassed. The aqueous solution used in the test was 1.0M NaCl solution, and applied power was frequency accelerated power having a voltage of 10 KV/rms with a frequency of 1.0 kHz in order to accelerate growth rate of the water tree.

After the test was completed, the sample was dyed with methylene blue and then cut. A growth length of the water tree was measured in the cut cross-section using a microscope. The results were compared as percent (%) value of the water tree growth length to the entire sample thickness as shown in the following Equation 1.

Water tree resistance (%)=water tree growth length (μm)/entire sample thickness (μm)×100       [Equation 1]

4) AC Dielectric Breakdown Strength Test

This test is to evaluate what degree is AC voltage that an insulating material may endure.

<Evaluation Method>

Test was performed ten times on each of the samples according to ASTM D149, and then the results were statically processed using Weibull distribution 5) Space Charge Distribution Test In the power cable, when a material including a polar group, ions, or the like, that may be present in an initial insulating material or a semi-conducting layer is infiltrated into an insulating layer by an electric field, or charges generated by polarization, ionization, or the like, in the insulator are moved by the electric field to be present in a predetermined position, the charge is called a space charge.

<Evaluation Method>

The space charge distribution was measured using a pulsed electro-acoustic method (PEA). A film having a thickness of 700 μm was manufactured, and applied voltage was adjusted so as to apply an electric field of 20 kV/mm to the film, and then space charge distribution was measured. An applying voltage time was set to 15 hours.

Example 1

As a linear polyethylene resin, a resin having a melt index of 0.5 g/10 min (at 190° C. under a load of 2.16 kg), a molecular weight distribution of 2, and a density of 0.920 g/cm$^3$ and containing α-olefin having 8 carbon atoms as a comonomer was used.

Based on 100 parts by weight of the resin, as additives, 0.4 parts by weight of an oxidation stabilizer, 0.3 parts by weight of a UV stabilizer, and 0.3 parts by weight of a processing aid were used and compounded with the resin, thereby preparing a composition for a power cable.

As the oxidation stabilizer, 0.2 parts by weight of Irganox 1330 (Ciba-Geigy), which is a primary antioxidant, and 0.2 parts by weight of Irganox 168 (Ciba-Geigy), which is a secondary antioxidant, were used. As the UV stabilizer, 0.3 parts by weight of UV 3346 (Cytec Korea) was used. As the processing aid, 0.3 parts by weight of FX 9613 (Dynamar) was used.

The compounding was performed using a twin screw extruder (screw diameter=30 mm, L/D=37). The sample was manufactured according to the conditions disclosed in ASTM D638.

Example 2

A composition for a power cable was prepared by the same method as in Example 1 except that 95 weight % of the linear polyethylene resin in Example 1 and 5 weight % of a low-density polyethylene resin having a melt index of 0.3 g/10 min (at 190° C. under a load of 2.16 kg) and a molecular weight distribution of 2 were mixed and used.

Example 3

A composition for a power cable was prepared by the same method as in Example 1 except that 90 weight % of the linear polyethylene resin in Example 1 and 10 weight % of a low-density polyethylene resin having a melt index of 0.3 g/10 min (at 190° C. under a load of 2.16 kg) and a molecular weight distribution of 2 were mixed and used.

Example 4

A composition for a power cable was prepared by the same method as in Example 1 except that 80 weight % of the linear polyethylene resin in Example 1 and 20 weight % of a low-density polyethylene resin having a melt index of 0.3 g/10 min (at 190° C. under a load of 2.16 kg) and a molecular weight distribution of 2 were mixed and used.

Example 5

A composition for a power cable was prepared by the same method as in Example 1 except that 70 weight % of the linear polyethylene resin in Example 1 and 30 weight % of a low-density polyethylene resin having a melt index of 0.3 g/10 min (at 190° C. under a load of 2.16 kg) and a molecular weight distribution of 2 were mixed and used.

Example 6

90 weight % of a resin having a melt index of 1.5 g/10 min (at 190° C. under a load of 2.16 kg), a molecular weight distribution of 2.5, and a density of 0.920 g/cm$^3$ and containing α-olefin having 8 carbon atoms as a comonomer was used as a linear polyethylene resin, and 10 weight % of a low-density polyethylene resin having a melt index of 3 g/10 min (at 190° C. under a load of 2.16 kg) and a molecular weight distribution of 3 was used.

As additives, an oxidation stabilizer, a UV stabilizer, a processing aid were used and compounded with the resin, thereby preparing a composition for a power cable.

As the oxidation stabilizer, 0.2 parts by weight of Irganox 1330 (Ciba-Geigy), which is a primary antioxidant, and 0.2 parts by weight of Irganox 168 (Ciba-Geigy), which is a secondary antioxidant, were used. As the UV stabilizer, 0.3 parts by weight of UV 3346 (Cytec Korea) was used. As the processing aid, 0.3 parts by weight of FX 9613 (Dynamar) was used.

Examples 7 to 9

Compositions for a power cable were prepared by the same method as in Example 6 except for changing the low-density polyethylene resin as shown in Table 3.

Examples 10 to 13

Compositions for a power cable were prepared by the same method as in Example 6 except for changing the linear polyethylene resin as shown in Table 5.

Examples 14 to 18

As shown in Table 7, compositions for a power cable further including polyethylene including a polar group in a chain were prepared. In this case, a polyethylene resin (HFS 500H, 2HChem.) including 1 weight % of maleic anhydride as the polar group was used.

Comparative Example 1

As a linear polyethylene resin, a resin having a melt index of 0.3 g/10 min (at 190° C. under a load of 2.16 kg), a molecular weight distribution of 2, and a density of 0.915 g/cm$^3$ and containing α-olefin having 8 carbon atoms as a comonomer was used.
A composition for a power cable was prepared by the same method as in Example 2.

Comparative Example 2

As a linear polyethylene resin, a resin having a melt index of 2.5 g/10 min (at 190° C. under a load of 2.16 kg), a molecular weight distribution of 2, and a density of 0.925 g/cm$^3$ and containing α-olefin having 8 carbon atoms as a comonomer was used.
A composition for a power cable was prepared by the same method as in Example 2.

Comparative Example 3

As a linear polyethylene resin, a resin having a melt index of 1.5 g/10 min (at 190° C. under a load of 2.16 kg), a molecular weight distribution of 2.5, and a density of 0.925 g/cm$^3$ and containing α-olefin having 8 carbon atoms as a comonomer was used.
As the low-density polyethylene resin, a low-density polyethylene resin having a melt index of 20 g/10 min (at 190° C. under a load of 2.16 kg), a molecular weight distribution of 3 was used.
A composition for a power cable was prepared by the same method as in Example 2.

Comparative Example 4

As a linear polyethylene resin, a resin having a melt index of 2.2 g/10 min (at 190° C. under a load of 2.16 kg), a molecular weight distribution of 2.5, and a density of 0.925 g/cm$^3$ and containing α-olefin having 8 carbon atoms as a comonomer was used.
As the low-density polyethylene resin, a low-density polyethylene resin having a melt index of 20 g/10 min (at 190° C. under a load of 2.16 kg), a molecular weight distribution of 2 was used.
As shown in Table 9, 60 weigh % of the linear polyethylene resin and 40 weight % of the low-density polyethylene resin were mixed.

Comparative Example 5

A product was prepared by the method in Example 1 disclosed in Korean Patent Laid-Open Publication No. 10-2010-0106871, and physical properties thereof were measured by the above-mentioned physical property measuring methods.
As a linear medium density polyethylene resin (A1), 70 weight % of a resin having a melt index of 1.9 g/10 min (at 190° C. under a load of 5 kg), a differential scanning calorimetry (DSC) enthalpy of 150 joule/g, and a molecular weight distribution of 3.5 and containing α-olefin having 8 carbon atoms as a comonomer was used.
As a high-density polyethylene resin (B1), 30 weight % of a high-density polyethylene resin having a melt index of 0.2 g/10 min (at 190° C. under a load of 5 kg), a DSC enthalpy of 220 joule/g, and a molecular weight distribution of 23 was used.
Based on 100 parts by weight of the binder resin, 0.8 parts by weight of additives and 3 parts by weight of carbon black were compounded with each other, thereby preparing a composition for a power cable.
As the additives C, an oxidation stabilizer, a thermal stabilizer, and a processing aid were used. In more detail, as the oxidation stabilizer, 0.2 parts by weight of Irganox 1330 (Ciba-Geigy), which is the primary antioxidant, and 0.2 parts by weight of Irganox 168 (Ciba-Geigy), which is the secondary antioxidant, were used. As the thermal stabilizer, 0.3 parts by weight of AO-412s (Adeka, Japan), which is a thioester based material, was used. As the processing aid, 0.1 parts by weight of FX 9613 (Dynamar) was used.
Carbon black (D) coated with titanium and having an average particle size of 18 nm, a surface area of 100 m$^2$/g, and a dibutyl phthalate (DBP) absorption amount of 150 cc/100 g was used.

TABLE 1

| Ingredient | | Example 1 Content | | Example 2 Content | | Example 3 Content | | Example 4 Content | | Example 5 Content | |
|---|---|---|---|---|---|---|---|---|---|---|---|
| Linear polyethylene resin | MI | 0.5 | 100 | 0.5 | 95 | 0.5 | 90 | 0.5 | 80 | 0.5 | 70 |
| | Density | 0.920 | | 0.920 | | 0.920 | | 0.920 | | 0.920 | |
| | Molecular weight distribution | 2 | | 2 | | 2 | | 2 | | 2 | |
| LDPE | MI | — | — | 0.3 | 5 | 0.3 | 10 | 0.3 | 20 | 0.3 | 30 |
| | Molecular weight distribution | — | | 2 | | 2 | | 2 | | 2 | |
| Additive (parts by weight) | Oxidation stabilizer | 0.4 | | 0.4 | | 0.4 | | 0.4 | | 0.4 | |
| | UV stabilizer | 0.3 | | 0.3 | | 0.3 | | 0.3 | | 0.3 | |
| | Processing aid | 0.3 | | 0.3 | | 0.3 | | 0.3 | | 0.3 | |

TABLE 2

| Classification | Unit | Example 1 | Example 2 | Example 3 | Example 4 | Example 5 |
|---|---|---|---|---|---|---|
| Processability | | Δ | ○ | ⊙ | ⊚ | ⊚ |
| Heat resistance (after heating) | Tensile strength (kgf/cm$^2$) | 366 | 365 | 363 | 364 | 363 |
| | Elongation (%) | 869 | 864 | 863 | 860 | 862 |
| Mechanical property (room temperature) | Tensile strength (kgf/cm$^2$) | 371 | 369 | 366 | 366 | 369 |
| | Elongation (%) | 861 | 859 | 858 | 855 | 855 |
| Water Tree | % | 29.0 | 28.9 | 29.1 | 29.1 | 29.0 |
| AC dielectric breakdown (ACBD) | kVrms/mm | 110.3 | 114.4 | 118.8 | 119.3 | 119.9 |

As shown in Table 2, it may be appreciated that as the content of the low-density polyethylene was increased, processability was improved, and ACBD characteristics were also improved.

TABLE 3

| Ingredient | | Example 6 Content | | Example 7 Content | | Example 8 Content | | Example 9 Content | |
|---|---|---|---|---|---|---|---|---|---|
| Linear polyethylene resin | MI | 0.5 | 90 | 0.5 | 90 | 0.5 | 90 | 0.5 | 90 |
| | Density | 0.920 | | 0.920 | | 0.920 | | 0.920 | |
| | Molecular weight distribution | 2 | | 2 | | 2 | | 2 | |
| LDPE | MI | 3 | 10 | 7 | 10 | 10 | 10 | 12 | 10 |
| | Molecular weight distribution | 3 | | 4 | | 5 | | 6 | |
| Additive (parts by weight) | Oxidation stabilizer | 0.4 | | 0.4 | | 0.4 | | 0.4 | |
| | UV stabilizer | 0.3 | | 0.3 | | 0.3 | | 0.3 | |
| | Processing aid | 0.3 | | 0.3 | | 0.3 | | 0.3 | |

TABLE 4

| Classification | Unit | Example 6 | Example 7 | Example 8 | Example 9 |
|---|---|---|---|---|---|
| Processability | | ○ | ⊙ | ⊚ | ⊚ |
| Heat resistance (after heating) | Tensile strength (kgf/cm$^2$) | 355 | 352 | 349 | 344 |
| | Elongation (%) | 859 | 855 | 849 | 840 |
| Mechanical property (room temperature) | Tensile strength (kgf/cm$^2$) | 360 | 356 | 352 | 349 |
| | Elongation (%) | 861 | 858 | 857 | 843 |
| Water Tree | % | 28.8 | 28.8 | 28.7 | 28.7 |
| ACBD | kVrms/mm | 120.0 | 121.0 | 120.8 | 120.7 |

As shown in Table 4, it was confirmed that as the melt index and the molecular weight distribution of the low-density polyethylene resin were increased, the tensile strength was decreased.

TABLE 5

| Ingredient | | Example 10 Content | | Example 11 Content | | Example 12 Content | | Example 13 Content | |
|---|---|---|---|---|---|---|---|---|---|
| Linear polyethylene resin | MI | 1.5 | 90 | 1.7 | 90 | 2.0 | 90 | 2.2 | 90 |
| | Density | 0.925 | | 0.930 | | 0.940 | | 0.945 | |
| | Molecular weight distribution | 2.5 | | 3 | | 4 | | 5 | |

TABLE 5-continued

| Ingredient | | Example 10 Content | | Example 11 Content | | Example 12 Content | | Example 13 Content | |
|---|---|---|---|---|---|---|---|---|---|
| LDPE | MI | 3 | | 3 | | 3 | | 3 | |
| | Molecular weight distribution | | 10 | | 10 | | 10 | | 10 |
| Additive (parts by weight) | Oxidation stabilizer | | 0.4 | | 0.4 | | 0.4 | | 0.4 |
| | UV stabilizer | | 0.3 | | 0.3 | | 0.3 | | 0.3 |
| | Processing aid | | 0.3 | | 0.3 | | 0.3 | | 0.3 |

TABLE 6

| Classification | Unit | Example 10 | Example 11 | Example 12 | Example 13 |
|---|---|---|---|---|---|
| Processability | | ○ | ◎ | ◎ | ◎ |
| Heat resistance (after heating) | Tensile strength (kgf/cm$^2$) | 348 | 343 | 342 | 336 |
| | Elongation (%) | 852 | 848 | 840 | 837 |
| Mechanical property (room temperature) | Tensile strength (kgf/cm$^2$) | 352 | 346 | 345 | 341 |
| | Elongation (%) | 852 | 849 | 845 | 841 |
| Water Tree | % | 28.8 | 28.7 | 28.7 | 28.6 |
| ACBD | kVrms/mm | 120.1 | 120.3 | 122.1 | 121.7 |

As shown in Table 6, it was confirmed that as the melt index, the density, and the molecular weight distribution of the linear polyethylene resin were increased, the tensile strength was decreased.

TABLE 7

| Ingredient | | Example 14 Content | | Example 15 Content | | Example 16 Content | | Example 17 Content | | Example 18 Content | |
|---|---|---|---|---|---|---|---|---|---|---|---|
| Polyethylene resin | MI | 0.5 | 95 | 1.5 | 90 | 1.7 | 80 | 2.0 | 80 | 2.2 | 70 |
| | Density | 0.920 | | 0.925 | | 0.930 | | 0.940 | | 0.945 | |
| | Molecular weight distribution | 2 | | 2.5 | | 3 | | 4 | | 5 | |
| LDPE | MI | 0.3 | 5 | 3 | 10 | 7 | 20 | 10 | 20 | 12 | 30 |
| | Molecular weight distribution | 2 | | 3 | | 4 | | 5 | | 6 | |
| Additive | Oxidation stabilizer | | 0.04 | | 1 | | 2 | | 3 | | 4 |
| | UV stabilizer | | 0.03 | | 0.5 | | 1 | | 1.5 | | 2 |
| | Processing aid | | 0.03 | | 0.5 | | 1 | | 1.5 | | 2 |
| Polyethylene including polar group in chain | MI | 0.1 | 1 | 0.5 | 5 | 1 | 10 | 1.0 | 15 | 2 | 20 |
| | Density | 0.920 | | 0.930 | | 0.940 | | 0.950 | | 0.960 | |

TABLE 8

| Classification | Unit | Example 14 | Example 15 | Example 16 | Example 17 | Example 18 |
|---|---|---|---|---|---|---|
| Processability | | ○ | ○ | ◎ | ◎ | ◎ |
| Heat resistance (after heating) | Tensile strength (kgf/cm$^2$) | 365 | 350 | 339 | 335 | 330 |
| | Elongation (%) | 867 | 855 | 840 | 838 | 833 |
| Mechanical property (room temperature) | Tensile strength (kgf/cm$^2$) | 370 | 353 | 342 | 341 | 333 |
| | Elongation (%) | 869 | 855 | 844 | 844 | 838 |

TABLE 8-continued

| Classification | Unit | Example 14 | Example 15 | Example 16 | Example 17 | Example 18 |
|---|---|---|---|---|---|---|
| Water Tree | % | 28.3 | 28.2 | 28.1 | 27.9 | 27.8 |
| ACBD | kVrms/mm | 120.1 | 121.2 | 123.5 | 123.7 | 124.5 |

As shown in Table 8, it was confirmed that as the polyethylene including the polar group in the chain was added, the water tree was decreased.

TABLE 9

| | Ingredient | Comparative Example 1 | | Comparative Example 2 | | Comparative Example 3 | | Comparative Example 4 | |
|---|---|---|---|---|---|---|---|---|---|
| | | Content | | Content | | Content | | Content | |
| Linear polyethylene resin | MI | 0.3 | 90 | 2.5 | 90 | 1.5 | 90 | 2.2 | 60 |
| | Density | 0.915 | | 0.925 | | 0.925 | | 0.925 | |
| | Molecular weight distribution | 2 | | 2 | | 2.5 | | 2.5 | |
| LDPE | MI | 0.3 | 10 | 0.3 | 10 | 20 | 10 | 20 | 40 |
| | Molecular weight distribution | 2 | | 2 | | 3 | | 2 | |
| Additive (parts by weight) | Oxidation stabilizer | 0.4 | | 0.4 | | 0.4 | | 0.4 | |
| | UV stabilizer | 0.3 | | 0.3 | | 0.3 | | 0.3 | |
| | Processing aid | 0.3 | | 0.3 | | 0.3 | | 0.3 | |

TABLE 10

| Classification | Unit | Comparative Example 1 | Comparative Example 2 | Comparative Example 3 | Comparative Example 4 | Comparative Example 5 |
|---|---|---|---|---|---|---|
| Processability | | X | ○ | ⊙ | ⊙ | X |
| Heat resistance (after heating) | Tensile strength (kgf/cm$^2$) | 377 | 318 | 302 | 282 | 346 |
| | Elongation (%) | 868 | 809 | 780 | 762 | 869 |
| Mechanical property (room temperature) | Tensile strength (kgf/cm$^2$) | 380 | 319 | 315 | 288 | 350 |
| | Elongation (%) | 875 | 813 | 790 | 792 | 871 |
| Water Tree | % | 27.9 | 29.5 | 29.5 | 29.7 | 33.5 |
| ACBD | kVrms/mm | 115.2 | 116.6 | 118.6 | 119.5 | 113.2 |

As shown in Table 10, it was confirmed that when the linear ethylene resin having a low melt index was used, the processability was poor. It was confirmed that in the case in which the melt index of the linear polyethylene was high as in Comparative Example 2, the heat resistance and mechanical property were poor. It was confirmed that in Comparative Example 3 in which the melt index of the low-density polyethylene resin was high, the heat resistance and mechanical property were poor, in Comparative Example 4 in which the content of the linear polyethylene was high, the heat resistance and mechanical property were also poor, and in Comparative Example 5 in which the low-density polyethylene was not present and the melt index of the used high-density polyethylene was also low, the processability was poor and water tree resistance was also poor.

As shown in Tables 1 to 10, it may be appreciated that in the case of using the composition according to the present invention, more excellent processability, mechanical property, heat resistance, water tress resistance, and AC dielectric breakdown strength were measured than those of the non-crosslinked polyethylene resin composition according to the related art. Particularly, it may be appreciated that the composition according to the present invention had more excellent processability and water tree resistance than those of the non-crosslinked polyethylene resin composition according to the related art.

The invention claimed is:

1. A non-crosslinked polyethylene composition for a power cable comprising:
  (a) a binder including 70 to 95 weight % of a linear polyethylene resin including α-olefin having at least four carbon atoms as a comonomer and having a melt index of 0.5 to 2.2 g/10 min (at 190° C. under a load of 2.16 kg), a molecular weight distribution of 2 to 5, and a density of 0.920 to 0.945 g/cm$^3$, and 5 to 30 weight % of a low-density polyethylene resin having a melt index of 0.3 to 12 g/10 min (at 190° C. under a load of 2.16 kg) and a molecular weight distribution of 2 to 6;

(b) 1 to 20 parts by weight of polyethylene including 0.1 to 2 weight % of a polar group in a chain and having a density of 0.920 to 0.960 g/cm$^3$ based on 100 parts by weight of the binder; and (c) additives.

2. The non-crosslinked polyethylene composition for a power cable of claim 1, wherein the additive is any one or at least two selected from an oxidation stabilizer, a UV stabilizer, or a processing aid, and the content of the additive is 0.1 to 20 parts by weight based on 100 parts by weight of the binder.

3. The non-crosslinked polyethylene composition for a power cable of claim 1, wherein the α-olefin having at least four carbon atoms is selected from butene, pentene, methylpentene, hexene, octene, or decene.

4. A power cable manufactured using the non-crosslinked polyethylene composition of claim 1.

* * * * *